Patented Feb. 13, 1934

1,947,438

UNITED STATES PATENT OFFICE 1,947,438

WOOD FILLER

James F. Walsh, South Orange, N. J., assignor to Celluloid Corporation, a corporation of New Jersey No Drawing. Application January 11, 1930
Serial No. 420,153

3 Claims. (Cl. 106—37)

This invention pertains to the general class of filling materials, and particularly to the class of wood fillers.

This invention pertains more particularly to a wood filler having as one of its ingredients, an organic filling material such as ground cork, cotton flock, wood flour, ground peat, etc. This class of filling materials has been used for many years in various plastic masses, together with volatile liquids which evaporate and form a solid mass. However, such masses upon evaporation of the solvent have been more or less subject to excessive shrinkages causing cracks in the material as well as leaving any depression filled thereby in a more or less incompletely and unsatisfactorily filled state.

An object of my invention therefore, is to provide a wood filler having a minimum amount of shrinkage upon solidification.

A further object of my invention is to provide a novel wood filler that may be of any desired plasticity when used; that will rapidly solidify without loosening from the walls of a filled depression; that is of relatively low cost; economical to use, and that is otherwise highly satisfactory for its intended purpose.

Many other objects and advantages will become apparent to persons skilled in the art as the specification proceeds.

My invention comprises combining together with a cellulose derivative and particularly with a cellulose ester, such as cellulose nitrate or cellulose acetate, a substantially non-volatile liquid modifier, a suitable gum or resin, and volatile solvents, sufficient solid organic filler in comminuted form, such that only a small degree of shrinkage results upon the evaporation of the volatile solvents. The elimination of excessive shrinkages not only eliminates a departure of the filler from the walls of the depression filled therewith, but also eliminates cracks in the surface of the filler, as well as resort to the customary practice of excessively over-filling a depression in order that the resultant surface of the dried mass of filler will be more or less substantially flush with the surface bearing the depression.

The following formulæ are given by way of illustration:

*Formula A*

| | Parts |
|---|---|
| Nitrocellulose | 100 |
| Dibutyl phthalate | 15 to 25 |
| Organic filler | 175 to 250 |
| Gum or resin | 60 to 65 |
| Castor oil | 20 to 35 |
| Volatile solvent | 400 to 640 |

*Formula B*

| | Parts |
|---|---|
| Pyroxylin | 100 |
| Dibutyl phthalate | 15 |
| Wood flour | 250 |
| Ester gum | 65 |
| Castor oil | 35 |
| Volatile solvent preferably comprising 70% acetone and 30% denatured ethyl alcohol | 640 |

*Formula C*

| | Parts |
|---|---|
| Cellulose acetate (preferably of variety soluble in acetone) | 100 |
| Triphenyl phosphate | 5 |
| Paraethyltoluenesulphonamid | 15 |
| Dibutyl tartrate | 5 |
| Dimethyl phthalate | 35 |
| Ester gum | 35 |
| Wood flour | 250 |
| Volatile solvent (preferably comprising 85% methylene chloride and 15% methyl alcohol) | 600 |

*Formula D*

| | Parts |
|---|---|
| Cellulose derivative | 100 |
| Substantially non-volatile modifier in liquid form | 35 to 60 |
| Resin | 60 to 65 |
| Comminuted organic material | 175 to 250 |
| Volatile solvent | 40 to 640 |

A stabilizer such as urea preferably in proportions ranging from .4 to 1 percent is generally added.

The above ingredients may be mixed and processed by any means known in the art. For instance, all the ingredients may be combined in a kneader and after thorough mixing, the mass is ready for use. To prevent premature evaporation of volatile solvent, the wood filler is preferably stored and shipped in air-tight containers.

I have produced a very satisfactory product by soaking nitrocellulose, substantially non-volatile liquid modifiers, gums or resins, stabilizer and 50% of the volatile solvents in an air-tight container for a period from six to twenty-four hours. At the end of the soaking period the organic filling material is wet with the balance of the solvent and then all of the ingredients are thoroughly mixed in a kneader. After thorough mixing, the mass is kept in air-tight containers until used.

Before evaporation of the volatile solvents, the mass has a plastic consistency similar to that of putty.

Examples of other cellulose derivatives are cellulose formate, cellulose propionate, cellulose butyrate, methyl cellulose, ethyl cellulose, benzyl cellulose, etc.

Examples of other liquid modifiers are tricresyl phosphate, diethyl phthalate, dibutyl tartrate, diamyl phthalate, blown rape seed oil, camphor oil, tung oil, etc., or combinations of same with or without dissolved solid modifiers such as camphor, triphenyl phosphate, paraethyltoluenesulphonamid, etc.

Of the total liquid modifier 25% to 60% is preferably made up of relatively good solvents for the particular cellulose derivative. The balance may be composed of substantially non-solvent softeners, such as castor oil, blown rape seed oil, camphor oil, tung oil, etc.

Examples of other volatile solvents are acetone, ethyl lactate, ethyl methyl ketone, or any of the known combinations of ethyl alcohol, methyl alcohol, acetone, chloroform, benzol, amyl acetate, ethyl lactate, ethyl methyl ketone, and/or other more or less volatile liquids as found most effective for the results desired.

Having described my invention, it is obvious that many modifications may be made in the same within the scope of the claims, without departing from the spirit of the invention.

I claim:

1. Wood filler comprising 100 parts cellulose ester, 35 to 60 parts substantially non-volatile liquid modifier, 35 to 65 parts resin, 250 parts comminuted organic filling material and 600 to 640 parts volatile solvent.

2. Wood filler comprising 100 parts nitrocellulose, 15 parts dibutyl phthalate, 65 parts ester gum, 35 parts castor oil, 250 parts wood flour and 640 parts volatile solvent comprising 70% acetone and 30% denatured ethyl alcohol.

3. Wood filler comprising 100 parts cellulose acetate, 5 parts triphenyl phosphate, 15 parts paraethyltoluene sulphonamid, 5 parts dibutyl tartrate, 35 parts dimethyl phthalate, 35 parts ester gum, 250 parts wood flour and 600 parts volatile solvent comprising 85% methylene chloride and 15% methyl alcohol.

JAMES F. WALSH.